US012443728B2

(12) United States Patent
Beier et al.

(10) Patent No.: US 12,443,728 B2
(45) Date of Patent: Oct. 14, 2025

(54) RESTRICTING DATA ACCESS TO TARGET DATABASES

(71) Applicant: INTERNATIONAL BUSINESS MACHINES CORPORATION, Armonk, NY (US)

(72) Inventors: Felix Beier, Haigerloch (DE); Eirini Kalogeiton, Stuttgart (DE); Vassil Radkov Dimov, Stuttgart (DE); Jens Müller, Stuttgart (DE); Johannes Severin Kern, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 18/341,241

(22) Filed: Jun. 26, 2023

(65) Prior Publication Data

US 2024/0427909 A1    Dec. 26, 2024

(51) Int. Cl.
*G06F 21/60*    (2013.01)

(52) U.S. Cl.
CPC .................................. *G06F 21/602* (2013.01)

(58) Field of Classification Search
CPC ...... G06F 21/602; G06F 16/275; G06F 21/62; G06F 21/6227; G06F 21/6218
See application file for complete search history.

(56) References Cited

U.S. PATENT DOCUMENTS

| 7,200,747 | B2 | 4/2007 | Riedel |
| 8,458,451 | B2 | 6/2013 | Shasha |
| 10,706,039 | B2 | 7/2020 | Beier |
| 11,003,787 | B2 | 5/2021 | Sion |
| 2006/0123250 | A1* | 6/2006 | Maheshwari ........... G06F 16/90 713/193 |
| 2010/0318812 | A1 | 12/2010 | Auradkar |

(Continued)

OTHER PUBLICATIONS

International Searching Authority, "Notification of Transmittal of the International Search Report and the Written Opinion of the International Searching Authority, or Declaration," Patent Cooperation Treaty, Sep. 20, 2024, 12 pages, International Application No. PCT/EP2024/066798.

(Continued)

*Primary Examiner* — Abiy Getachew
(74) *Attorney, Agent, or Firm* — Teddi Maranzano

(57) ABSTRACT

According to one embodiment, a method, computer system, and computer program product for performing data synchronization between a source DBMS, comprising a trusted database, and a target DBMS, comprising an untrusted datastore and a trusted datastore, is disclosed. The present invention may include upon the source DBMS performing an update to an object in the trusted source database, sending the object change to a trusted data replication engine, encrypting the object change, sending the encrypted object change with a related decryption key to the target DBMS, upon receiving the encrypted object change and the related decryption key at the target DBMS, searching an object related to the object change in the untrusted target data store, identifying a decryption key for the searched object, replacing the identified decryption key by the received decryption key, and integrating the encrypted object change in encrypted form into the untrusted target data store.

17 Claims, 5 Drawing Sheets

(56) References Cited

U.S. PATENT DOCUMENTS

| | | | |
|---|---|---|---|
| 2015/0178506 A1* | 6/2015 | Elovici | H04L 63/0435 |
| | | | 713/189 |
| 2019/0121887 A1* | 4/2019 | Beier | G06F 21/6227 |
| 2019/0121892 A1* | 4/2019 | Beier | G06F 16/24547 |

OTHER PUBLICATIONS

Amazon, "Replicating objects created with server-side encryption (SSE) using KMS keys," Amazon Simple Storage Service—User Guide, Mar. 1, 2006 [accessed on Jun. 1, 2023], 9 pages, Retrieved from the Internet: <URL: https://docs.aws.amazon.com/AmazonS3/latest/userguide/replication-config-for-kms-objects.html>.

Hashicorp, "Manage Secrets & Protect Sensitive Data," vaultproject.io [online], Datasheet, [accessed on Jun. 1, 2023], 4 pages, Retrieved from the Internet: <URL: Vault: https://www.vaultproject.io/>.

IBM Security, "IBM Security Guardium Key Lifecycle Manager," IBM [online], [accessed on Jun. 1, 2023], 6 pages, Retrieved from the Internet: <URL: https://www.ibm.com/products/ibm-security-key-lifecycle-manager>.

IBM, "DB2 Analytics Accelerator for z/OS 7.5," IBM [online], [accessed on Jun. 1, 2023], 2 pages, Retrieved from the Internet: <URL: https://www.ibm.com/docs/en/daafz/7.5>.

IBM, "Db2 Data Gate on Cloud Pak for Data," IBM [online], May 26, 2022 [accessed on Jun. 1, 2023], 2 pages, Retrieved from the Internet: <URL: https://www.ibm.com/docs/en/cloud-paks/cp-data/4.0>.

IBM, "Making queries wait for incremental updates," IBM [online], Dec. 14, 2022 [accessed on Jun. 1, 2023], 6 pages, Retrieved from the Internet: <URL: https://www.ibm.com/docs/en/daafz/7.5?topic=continually-making-queries-wait-incremental-updates#c_idaa_incr_updt_waitfordata__table_awy_ngm_gfb>.

IBM, "Making queries wait for synchronization updates," IBM [online], Apr. 27, 2022 [accessed on Jun. 1, 2023], 4 pages, Retrieved from the Internet: <URL: https://www.ibm.com/docs/en/cloud-paks/cp-data/4.0?topic=gate-waitfordata-queries>.

* cited by examiner

RESTRICTING DATA ACCESS TO TARGET DATABASES

BACKGROUND

The present invention relates, generally, to data synchronization between a source database management system and a target database management system, and more specifically, to the performance of data synchronization between a source database management system, comprising a trusted source database, and a target database management system, comprising a target database, comprising an untrusted target data store and a trusted target data store. The present invention relates further to a related database management system for data synchronization between a source database management system, a target database management system, and a computer program product.

Data management remains a high priority of a chief information offer's ("CIO") agenda for a considerable number of enterprises and government organizations. This is because the amount of data to be managed within an organization is constantly growing, as well as the growing complexity of data management which is accelerated by the growing number of data sources as well as options for storing data. Short-term storage is competing with long-term storage and on-premises storage is competing with Cloud storage. One of the perceived disadvantages of Cloud storage is that it may be untrustworthy, and thus, storing data on Cloud storage systems requires more data security efforts as well as data synchronization efforts. Therefore, actual laws and regulations, such as GDPR, HIPAA, CCPA, etc., require that data cannot be stored indefinitely on data stores. Thus, arises the problem of how to restrict access to multiple copies of data that expires on the original source system or should not be used anymore.

SUMMARY

According to one embodiment of the present invention, a method, computer system, and computer program product for performing data synchronization between a source database management system ("DBMS"), comprising a trusted source database, and a target database management system, comprising a target database comprising an untrusted target data store and a trusted target data store may be provided. The present invention may comprise receiving an object update request by the source database management system, and upon the source database management system performing an update to an object in the trusted source database, where the update to the object relates to an object change, the method may comprise sending the object change to a trusted data replication engine, encrypting the object change, sending the encrypted object change together with a related decryption key to the target DBMS.

Furthermore, the present invention may comprise, upon receiving the encrypted object change and the related decryption key at the target database management system, searching an object related to the object change in the untrusted target data store, identifying a decryption key for the searched object, replacing the identified decryption key by the received decryption key, and integrating the encrypted object change in encrypted form into the untrusted target data store.

According to at least one embodiment of the present invention, a database management system for data synchronization between a source database management system and a target database management system may be provided. The system may comprise one or more processors and a memory operatively coupled to the one or more processors, wherein the memory stores program code portions which, when executed by the one or more processors, enable the one or more processors to receive an object update request by the source database management system, and upon the source database management system performing an update to an object in the trusted source database, where the update to the object relates to an object change, send the object change to a trusted data replication engine, encrypt the object change, send the encrypted object change together with a related decryption key to the target database management system.

Additionally, the system may comprise, upon receiving the encrypted object change and the related decryption key at the target database management system, searching an object that relates to the object change in the untrusted target data store, identifying a decryption key for the searched object, replacing the identified decryption key with the received decryption key, and integrating the encrypted object change in encrypted form into the untrusted target data store.

BRIEF DESCRIPTION OF SEVERAL VIEWS OF THE DRAWINGS

It should be noted that embodiments of the invention are described with reference to different subject matters. In particular, some embodiments are described with reference to method-type claims, whereas other embodiments are described with reference to apparatus-type claims. However, a person skilled in the art will gather from the above and the following description that, unless otherwise notified, in addition to any combination of features belonging to one type of subject matter, also any combination between features relating to different subject matters, in particular, between features of the method type claims, and features of the apparatus type claims, is considered as to be disclosed within this document.

The aspects defined above, and further aspects of the present invention are apparent from the examples of embodiments to be described hereinafter and are explained with reference to the examples of embodiments to which the invention is not limited.

Figure 1:
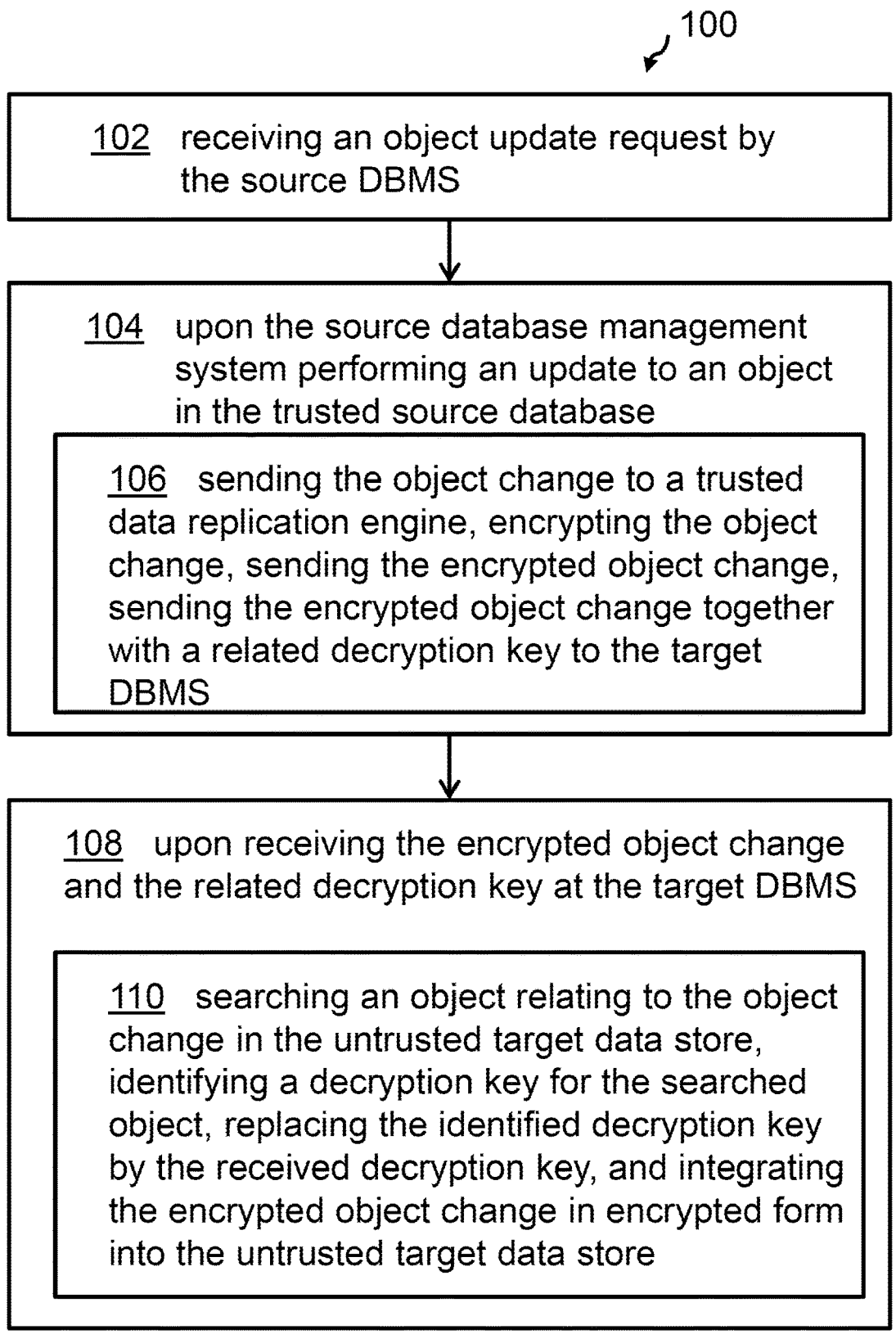
Figure 2:
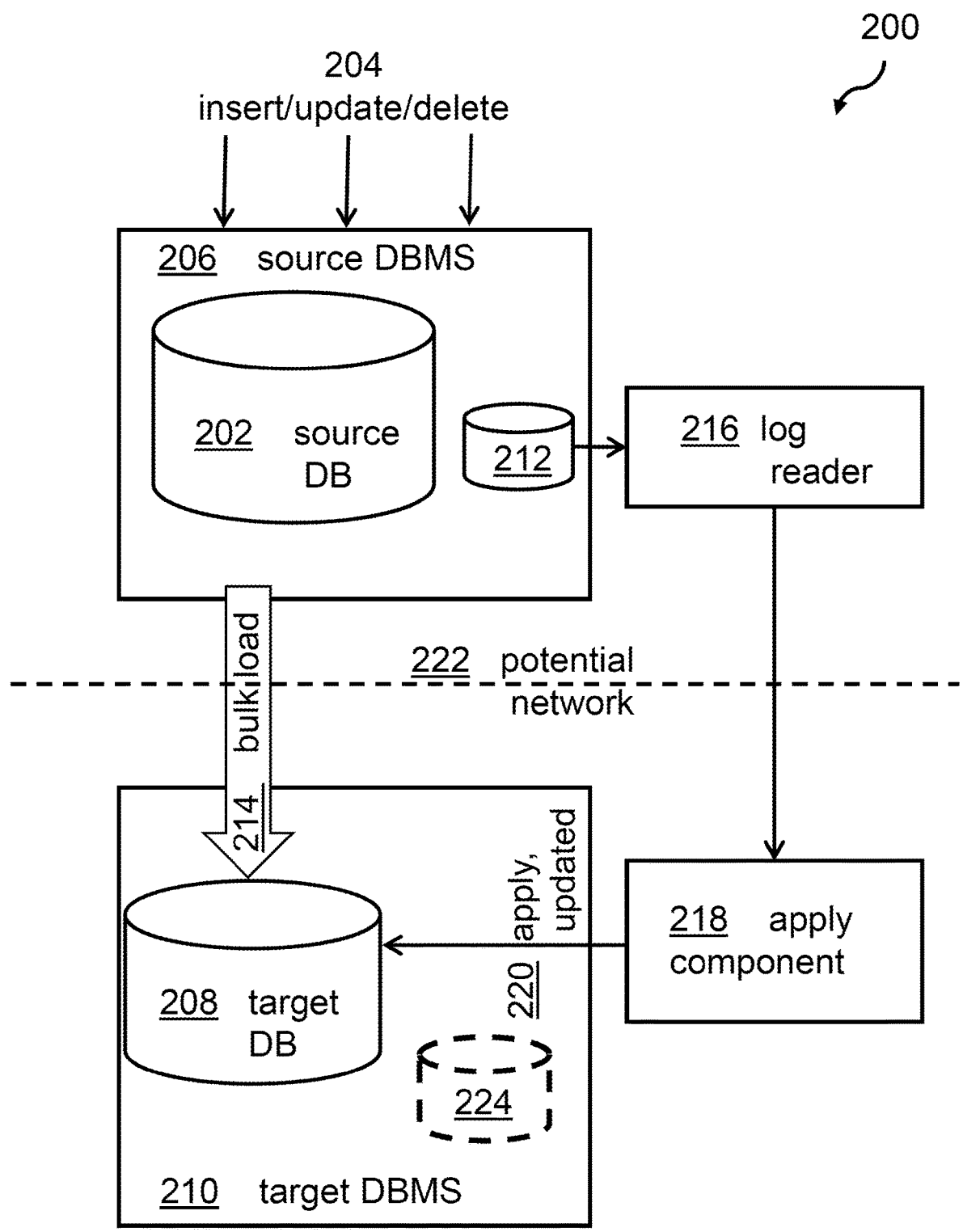
Figure 3:
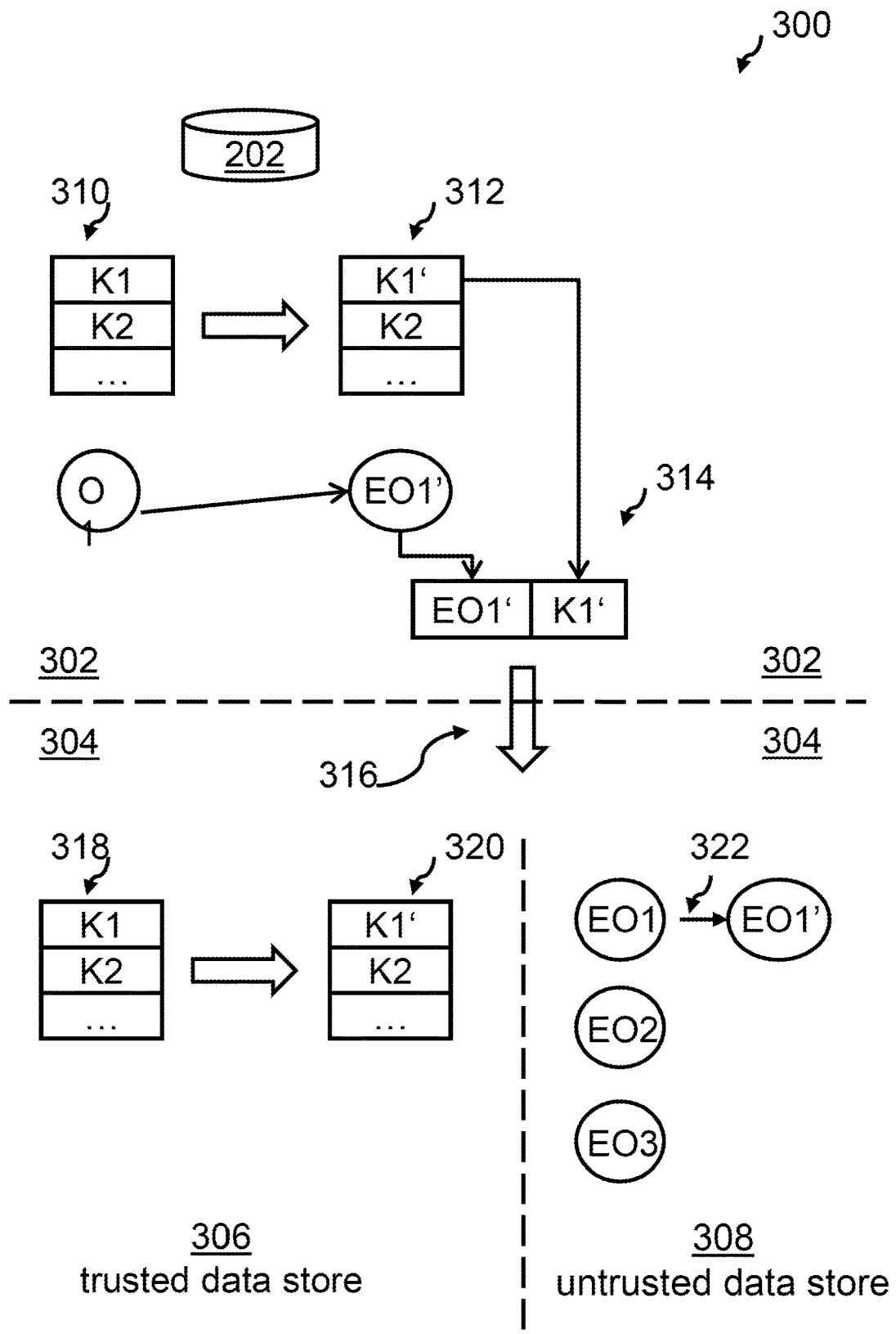
Figure 4:
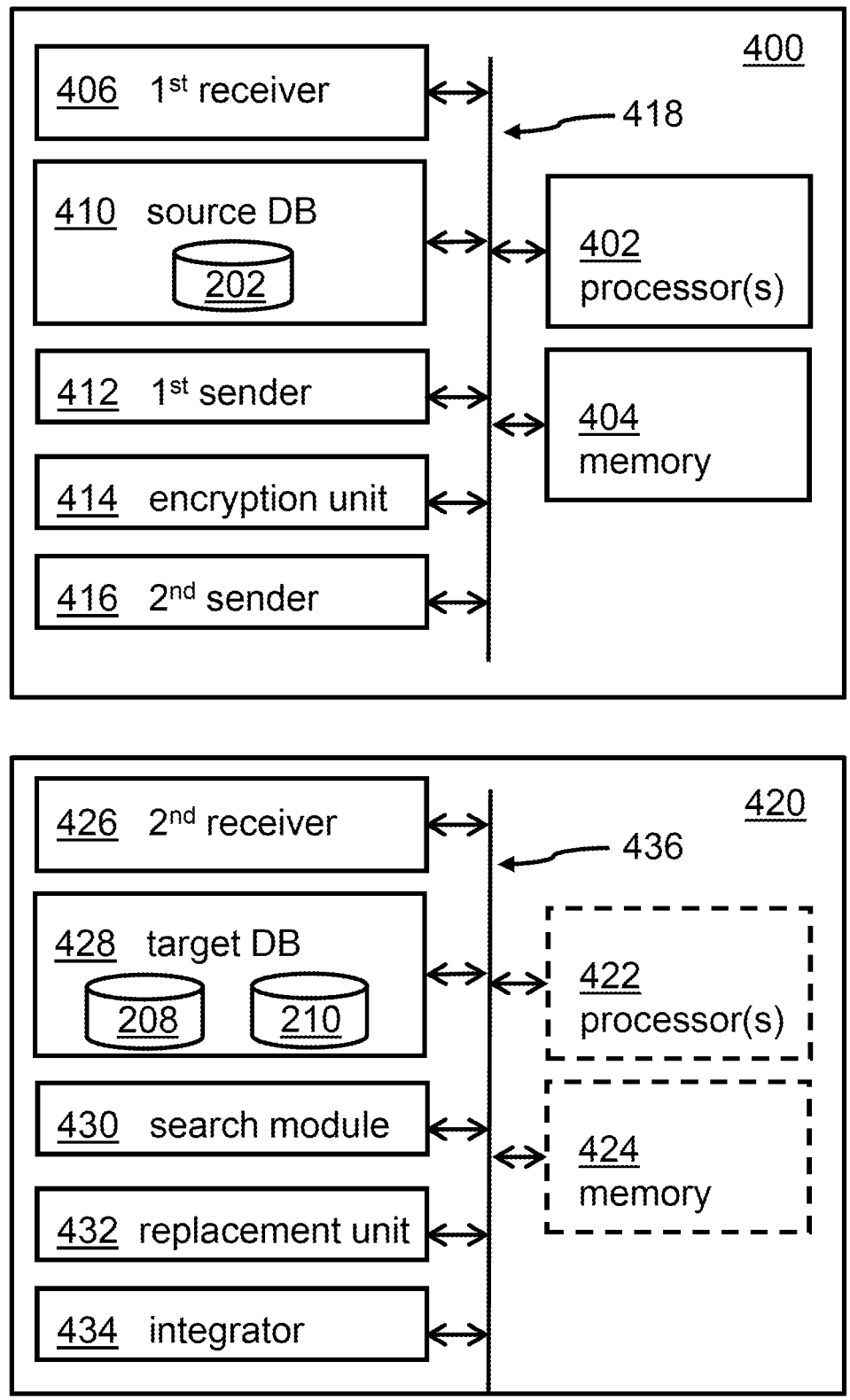
Figure 5:
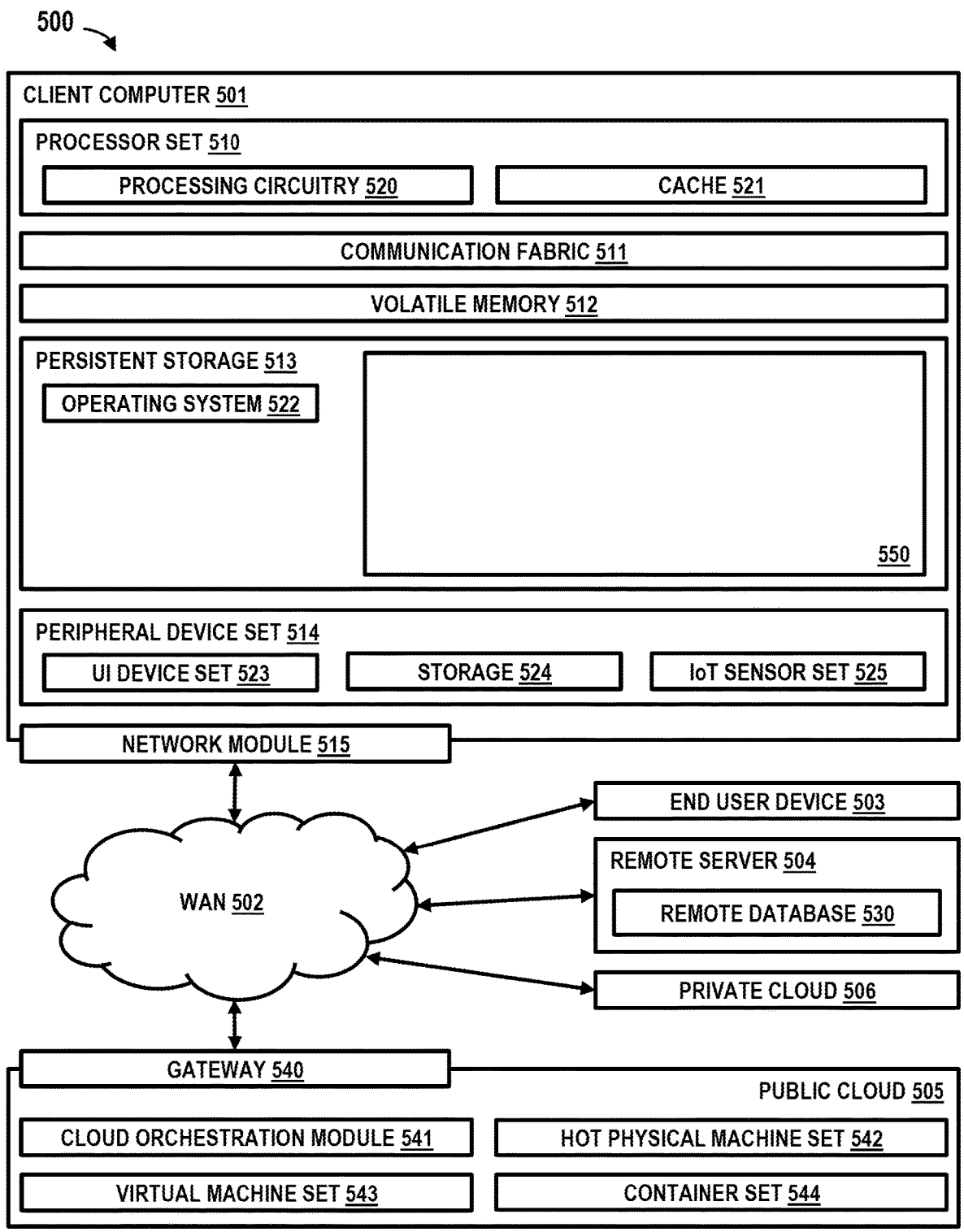

Preferred embodiments of the invention will be described, by way of example only, and with reference to the following drawings:

FIG. 1 illustrates a block diagram for performing data synchronization between the source database management system and the target database management system, according to at least one embodiment;

FIG. 2 illustrates a block diagram of a data synchronization system, to which the present invention can be compliant, according to at least one embodiment;

FIG. 3 illustrates a block diagram of elements of the present invention, related key ring concepts, and flow of actions according to at least one embodiment;

FIG. 4 illustrates a block diagram of the database management system, as well as data synchronization between the source database management system and the target database management system, according to at least one embodiment; and FIG. 5 illustrates an exemplary networked computer environment according to at least one embodiment.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Presently, various methods are existing that are related to data synchronization. For example, one current method introduces a paradigm for outsourcing the transaction processing of a multi-client database application to an untrusted service provider. Thereby, untrusted service providers can support transaction serialization, backup and recovery of client data with full data confidentiality and correctness. Furthermore, another current method discloses a method that separates query processing operations from transaction management and data storage operations to provide secure outsourced data management assurances while remaining practically viable for commercial deployment. Thereby, the secure database management system and method include an untrusted database module that performs transaction management and data storage operation on encrypted data from at least one network-accessible computer, and a trusted database module that processes user-generated queries and commands on a secure client device by selectively assessing, decrypting and re-encrypting the encrypted data on an at least one network-accessible computer.

However, in many cases, such synchronizations may not operate fully transparent to a user and other data management processes, such as auto-classification of data which may often be used for machine-learning purposes.

Thus, there exists a need to overcome these deficiencies and provide data synchronization methods and techniques that can bridge the gap between on-premises data management of data and data management in Cloud storage systems.

The proposed computer-implemented method for performing data synchronization between a source database management system, comprising a trusted source database, and a target database management system, comprising a target database, comprising an untrusted target data store and a trusted target data store, may offer multiple advantages, technical effects, contributions and/or improvements.

The present invention may bring additional capabilities to products of a cloud database portfolio by increasing the value of the related products by providing a new solution to a well-known restriction. The present invention may enhance the trustworthiness of the related storage systems by increasing the security and privacy reliability when the data replication pattern may be applied in a data fabric concept. Also, the present invention may directly address the requirement of restricting data access to a target database that may exist on a Cloud storage system to be compliant with security requirements and respect customer data privacy. The present invention comprises the advantage of extending the capabilities of database Cloud applications without impacting performance. Additionally, the present invention can be completely transparent to data governance systems, data archiving systems, metadata management systems, etc.

The present invention may enhance data security by preventing direct access to data stored in data stores, particularly, untrusted data stores. While data is being accessed directly on an untrusted target data store, the present invention can return the data in an encrypted format, meaning that the data is unusable for further processing or interpretation.

The present invention can store data that is already encrypted in the trusted replication engine/system, and that data is only stored in an encrypted form in the untrusted data stores. In order to access the data, the untrusted data store can be combined with a directly related trusted data store to form the target database and wherein the trusted data store only stores access keys. Furthermore, the present invention may manage the expiration of key updates.

The present invention can prevent direct access to data in the target data store because the data is returned in an encrypted form, meaning that the data is unusable for further processing and/or interpretation. Additionally, the present invention can restrict access to data that must not be accessed anymore, for example, because the keys have expired or updated, so newer versions of the data cannot be accessed using the old access keys. Furthermore, the present invention may prevent attacks on the target database, due to the encryption, and as a result, users and/or applications may need to take an extra step to access the data.

Furthermore, the present invention may comprise a strict access management using expiring keys to enhance the security of the database systems and also to provide that the database systems are compliant with any applicable laws and regulations.

In the following, additional embodiments of the present invention, applicable to the method as well as to the system and the computer program product, will be described.

According to at least one embodiment of the present invention, the encryption of the object change may be performed by the trusted data replication engine or trusted data replication system. This may guarantee a high degree of data security because typically the trusted data replication engine may be operated on-premises, for example, under the control of a specific enterprise, and not by a cloud operator. The trusted data replication engine or system may also be part of the source DBMS.

According to at least one embodiment of the present invention, the method may also comprise maintaining a set of decryption keys by the trusted data replication engine related to encryption keys used by the trusted data replication engine. Because the trusted data replication engine may be operated within an enterprise and under its own security guidelines, the decryption keys used may be securely managed.

According to at least one embodiment of the present invention, each decryption key of the set of decryption keys may have a unique identifier compatible with an object identifier for objects in the trusted source database such that each object is mappable to a related decryption key. This may be achieved via naming conventions for the unique identifier and object identifiers in the trusted source DBMS. The unique identifier concept may also work in the environment of the untrusted target database.

According to at least one embodiment of the present invention, the set of decryption keys may be implemented using one or more hash tables. Using hash tables or hash algorithms for encryption/decryption purposes is a well-known and trusted technique used by many data security concepts. Therefore, the present invention may be integrated with existing data security technologies.

According to at least one embodiment of the present invention, the decryption key may be stored in the trusted target data store. This may, for example, be done by a key store or a virtual key ring for managing a plurality of keys. Due to the fact that the virtual key ring may be stored in the trusted target data store, the keys may be difficult to detect and misused by cyber-attacks.

According to at least one embodiment of the present invention, the encryption of the object change may be performed using the related encryption key. In another embodiment of the present invention, a decryption key may be used instead. Although, this may require a symmetric encryption scheme in which the encryption and decryption keys may be identical. Additionally, the present invention may also be implemented using asymmetric key pairs. In such a case, only the decryption key may have to be transmitted to the target database, or more specifically, to its trusted data store. The encryption key may remain in the replication engine altogether.

According to at least one embodiment of the present invention, the encryption and/or decryption key may be transmitted to the trusted target data store depending on the type of encryption/decryption selected.

According to at least one embodiment, the present invention may also comprise, upon receiving a query for an object in the target database, retrieving a corresponding latest encrypted object version from the untrusted target data store, retrieving a decryption key related to the queried object, and decrypting the latest encrypted object version using the identified decryption key.

Additionally, the decrypted queried object, for example, the query results, may be returned to the requester. Thus, the decryption key and the related data under the control of the target DBMS may both be managed as part of a Cloud storage system. However, the location and/or security measures for the stored key(s) and the related data may be completely different enabling commercial, organizational, technical, in particular in terms of infrastructure, and access time advantages.

According to at least one embodiment of the present invention, retrieving the decryption key related to the queried object may also comprise retrieving the decryption key related to the queried object from the trusted target data store of the target DBMS or, alternatively, from the trusted data replication engine, instead of from the trusted target data store. Thus, key management may be performed entirely on-premises/on-premises without the need to use external resources.

According to at least one embodiment of the present invention, the method may also comprise performing an automatic key expiration rule for the decryption key. The rule may comprise a replacement of the keys at regular time intervals, as well as other time intervals, ensuring potential re-encryption of the related data stored in the untrusted target data store. Thus, a sort of heartbeat protocol, for example, the "I-am-alive" protocol, may be comprised between the source DBMS and the target DBMS. Also, the present invention may enhance data security for data stored in potentially untrusted environments like Cloud storage systems.

Furthermore, embodiments may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

In the context of this description, the following technical conventions, terms, and/or expressions may be used:

The term 'data synchronization' may denote to keep data managed in one database in sync with data managed in a second database. The synchronization does not need to be instantaneously but may be organized within a certain time period after the data in the source database have been changed.

The term 'database management system' (DBMS) may denote a system adapted for managing data in a database or data store. In particular, the DBMS may be responsible for changing data in the sense of inserting, modifying (updating), reading, and deleting data in the underlying data store. The data store may be of trusted or untrusted character. Trusted data stores may denote those in which data changes may only be performable by trusted processes and with a proper authentication process. In particular, trusted databases may be very difficult to compromise. In contrast, untrusted data stores may typically be found in Cloud computing environments which can often not be managed with the same security standards as in-house enterprise-class data management systems.

The term "source database" may denote a database in which an initial data modification, in particular, insert, update, or delete, may have been executed. This may be in contrast to a 'target database' which may denote a secondary database that may store the same data content after a data synchronization from the source database to the target database has been executed.

The term 'object update request' may denote a demand for an update, i.e., a change in the sense of insert, update, or delete of data in a database.

The term 'update' may denote change operations to data in a database in the sense of insert, update, or delete of data in a database or data store.

The term 'decryption key' may denote a binary code or key used to decrypt a data object in order to make it readable/interpretable again. For the related reverse operation, for example, the encryption, an 'encryption key' may be used. For a symmetric encryption/decryption, the related encryption/decryption key may be identical, wherein for an asymmetric encryption/decryption the keys for the encryption and the decryption may be different but related to each other.

In the following, a detailed description of the figures will be given. All instructions in the figures are schematic. Firstly, a block diagram of an embodiment of the inventive computer-implemented method for performing data synchronization between a source database management system, comprising a trusted source database, and a target database management system, comprising a target database comprising an untrusted target data store and a trusted target data store, is given. Additionally, further embodiments, as well as embodiments of the database management system for synchronization between a source database management system and a target database management system, will be described.

Beginning now with FIG. 1, a block diagram of an embodiment of the computer-implemented method 100 for performing data synchronization between a source database management system, comprising a trusted source database, and a target database management system, comprising a target database comprising an untrusted target data store and a trusted target data store, is depicted, according to at least one embodiment. The method 100 comprises receiving, 102, an object update request by the source database management system. Thereby, the update relates to all typical data manipulation activities, such as inserting, updating of a given object, and deleting, also referred to as "IUD".

In block 106, the method 100 comprises upon the source database management system performing an update, such as the IUD of an object in the trusted source database, more specifically, comprising an object change 104, performing the following activities: (1) sending the object change, relating to the object update request, to a trusted data replication system; (2) encrypting the object change in the trusted data replication system; and (3) sending the encrypted object change, comprising the updated object, together with a related decryption key to the target database management system. The above-mentioned activities can be performed by the trusted data replication system.

In block 110, the method 100 comprises upon receiving the encrypted object change and the related decryption key at the target database management system 108, performing the following activities: (1) searching an object related to the object change in the untrusted target data store; (2) identifying a decryption key for the searched object; (3) replacing the identified decryption key with the received decryption key; and (4) integrating, by performing IUD, the encrypted object change in encrypted form into the untrusted target data store. In the case a delete operation is to be performed, no object may be integrated. Furthermore, the old decryption key can be deleted.

Referring now to FIG. 2, a block diagram of linked databases 200 is depicted according to at least one embodiment. The primary or trusted source database 202 of the source DBMS 206 can typically receive online transaction processing ("OLTP") queries 204 and the target database 208 typically can receive online analytical processing ("OLAP") queries, however, OLTP queries may be received as well, either directly or indirectly via the source database or, in general by the database management system. However, the present invention can be independent of OLTP and OLAP operations. As a result, for the purpose of typical usage of the present invention, identified OLAP queries can be transferred or offloaded to the secondary or target database, which can comprise a trusted 224 and an untrusted data store 208 that can be managed by the target DBMS 210. In the source database 202, as well as in the target store, data can be managed in tables, for example, row and/or column-oriented. Tables in the target data store can represent at least a subset of the database tables of the source database and at least a subset of the data in a specific database table. In some embodiments of the invention, the source DBMS 206 and the target DBMS 210 may manage the trusted source database, the trusted data store 224, and the untrusted data store 208.

OLTP queries 204 can be executed directly using the source database 202 and returning query results to the requesting program or process. Thus, the OLTP or source database 202 can operate at its best performance because it is not slowed down by any resource-intensive OLAP queries.

Because of a potentially different data organization in the target data store 208, for example, column-oriented instead of row-oriented as in the source or OLTP database 202, the target database may return OLAP results much faster than the source database 202.

A replication from the source database 202 to the target data store 208 can be achieved by a bulk load process 214 (at least an initial load) and/or via the (recovery) log file 212, the log reader 216, and the applying component 218 that applies, 220, the required update operations to the target data store 208 using known technologies.

It shall also be mentioned that the source database 202 and the target data store 208 may be operated in a cloud-native or also hybrid cloud environment, i.e., reachable via network 222. For example, the trusted source database 202 may be operated on-site at a company's premises, while the target database 208 may be operated using remote cloud computing resources. Furthermore, multiple target databases 208 may be operated in different regional geographies allowing decentralized OLAP queries for, for example, subsidiaries of a company. However, if the target data store(s) is/are read-only, potentially required updates to the corporate database may be performed under network latency and bandwidth constraints. Therefore, it may be useful not only to read data from the remote, cloud-operated target database but also to use the target data store for updates, for example, data manipulation actions. A description of FIG. 3, below, describes how this can be advantageously achieved.

Referring now to FIG. 3, a block diagram of elements 300 of the present invention and the related key ring concepts and flow of actions, is depicted according to at least one embodiment. This figure may also be understood as a mix of a flowchart and involved elements.

It should be noted that FIG. 3 may be separated into three distinct areas. Above the dashed horizontal line all objects and activities can be related to the trusted target database area 302, whereas everything below the dashed horizontal line, all objects and activities can be related to the target DBMS area 304. Here, the left side to the vertical dashed line can refer to key management activities, for example, the key ring 314 and 316 stored and managed in the trusted data store 306; and the right side to the vertical dashed line can refer to the untrusted data store 308, for example, the managed encrypted data objects. These can be organized in tables and columns or may be managed according to completely different data organization schemes.

Upon receiving a change request, the source database 202 can update at least one object O1 with the new version O1'. The (trusted) replication engine or trusted replication system can receive the object change (O1→O1'), for example, by reading the transaction or recovery log of the trusted source database 202.

Upon receiving the object change, the replication engine can check its key ring 310 (or key store) to identify the key that is associated with the object, i.e., K1. The replication engine can generate a new key for the updated object, for example, K1', and can replace the previous key in the key ring 310 with the most recently generated key 312.

The replication engine can encrypt the object with the new key K1', leading to a new encrypted version of O1, namely EO1'.

Next, the replication engine can send, 316, the pair [K1', EO1'] comprising the newly encrypted object EO1' with the new key K1', to the target DBMS.

Upon receiving the object-key pair 314 in that target DBMS, the target DBMS (i) can search the object's entry inside its trusted data store key ring 318 to identify the previous key K1 associated with the target, and can replace the identified key K1 with the newly received key K1' to form the updated key ring 320 in the trusted data store 306. Then, the target DBMS can insert the received encrypted object EO1' into the untrusted data store 308, where it is stored beside other encrypted objects EO2', EO3', etc.

This general flow of activities also supports the insertion of a new object. In this case, there can be no magic in the data replication engine's key ring. In contrast, if the received object relates to an update of a previously replicated data object, then there can be a match in the data replication engine's key ring.

It may also be contemplated that the target database may comprise at least one untrusted data store in the sense that stored objects can be retrieved directly without the trusted access context. The untrusted data store may also be a shared database in a multi-tenant cloud database environment. Therefore, the untrusted data store, which usually provides the usual create, read, update, and delete ("CRUD") interfaces for object management may be combined with a trusted data store and wrapped together to form the new target database. As a consequence, the untrusted data store may comprise only encrypted data that can safely be retrieved but not used without having a corresponding decryption key. In contrast, the trusted data store may not comprise any user data, but may comprise a key ring that stores the incoming keys from the replication engine.

Upon receiving the key and an encrypted object from the data replication engine, the new target database, in its trusted data store, can create/update its key ring, can create the new key's expiration time, and can store the encrypted object in its untrusted data store.

To execute a query in the new target database, the key for the object can be extracted from the trusted data store, and the encrypted object can be extracted from the untrusted data store.

If no key is identified in the trusted data store, or if the key has expired, then the target database cannot execute queries successfully. The same result can apply to a user trying to access some data directly from the untrusted data store. Thus, the user may receive an encrypted version of the data, without any decrypted information. Such information may also be delivered in case of unauthorized data access.

Finally, if no update of an existing data object has been received, the expiration of its key can be prevented if the data object is still valid. In this case, the replication engine may reset the expiration time of the key and sends the information to the trusted data store where it can be stored.

Referring now to FIG. 4, a block diagram of the inventive database management system for data synchronization between a source database management system 400 and a target database management system 420, is depicted according to at least one embodiment. As previously mentioned, in some embodiments of the present invention, the source DBMS 400 and the target DBMS 420 may be integrated. In such embodiments, the processor and memory of the DBMS can both be identical.

In general, the system can facilitate data synchronization between a source database management system 400, comprising a trusted source database, and a target database management system 420, comprising a target database that comprises an untrusted target data store and a trusted target data store. The source DBMS 400 can comprise one or more processors 402 and a memory 404 operatively coupled to the one or more processors. Thereby, the memory 404 can store program code portions which, when executed by the one or more processors 402, enable the one or more processors 402 to receive, in particular by a first receiver 406, an object update request by the source database management system.

Upon the source database management system 400 performing an update to an object in the trusted source database 410, where the update to the object relates to an object change, the processor(s) can send, in particular by a first sender 412, the object change to a trusted data replication engine (not explicitly shown), to encrypt, in particular by the encryption unit 414, the object change, and can send, in particular by the second sender 416, the encrypted object change together with a related decryption key, to the target database management system 420.

Upon receiving, in particular by a second receiver 426, the encrypted object change and the related decryption key at the target database management system 420, the processor(s) 422 in combination with a memory 424, in an identical method as described above, can search, in particular using a search module 430, an object related to the object change in the untrusted target data store of the target database 428, to identify, in particular, the search module 430 using a decryption key for the searched object, to replace, in particular by a replacement unit 432, the identified decryption key by the received decryption key, and to integrate the encrypted object change in encrypted form into the untrusted target data store. The encrypted object change in encrypted form can be integrated into the untrusted target data store using the integrator 434.

It shall also be mentioned that the different functional units, modules and functional blocks, in particular, the processor(s) 402, the memory 404, the first receiver 406, the source database 410, the first sender 412, the encryption unit 414, and the second sender 416, may be communicatively coupled to each other for signal or message exchange in a selected 1:1 manner. Alternatively, the functional units, modules and functional blocks may be linked to a system internal bus system 418 for a selective signal or message exchange.

Similarly, the different functional units, modules and functional blocks, in particular, the processor(s) 422, the memory 424, the second receiver 426, the target database 428 (with the trusted data store and the untrusted data store), the search module 430, the replacement unit 432 and the integrator 434, may be communicatively coupled to each other for signal or message exchange in a selected 1:1 manner. Alternatively, the functional units, modules and functional blocks may also be linked to a system internal bus 436 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine-readable code corresponding to instructions and/or data for performing computer operations specified in a given CPP claim. A storage device is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 5, a computing environment 500 comprising a database management system 550 for the execution of at least some of the computer code involved in performing the inventive methods, such as the computer-implemented method for performing data synchronization between a source database management system, comprising a trusted source database, and a target database management system, comprising a target database, comprising an untrusted target data store and a trusted target data store, is depicted, according to at least one embodiment.

In addition to block 550, computing environment 500 includes, for example, computer 501, wide area network (WAN) 502, end-user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off-chip." In some computing environments, processor set 510 may be designed for working with qubits and performing quantum computing.

Computer readable program instructions are typically loaded onto computer 501 to cause a series of operational steps to be performed by processor set 510 of computer 501 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read-only memory (ROM), but typically at least a portion of the persistent storage allows writing of data, deletion of data, and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (e.g., secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (e.g., embodiments that utilize software-defined networking (SDN)), the control functions and the forwarding functions of network module 515 are performed on physically separate devices, such that the control functions manage several different network hardware devices. Computer-readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer, and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

It should also be mentioned that the database management system 550 for data synchronization between a source database management system and a target database management system can be an operational sub-system of the computer 501 and may be attached to a computer-internal bus system.

The terminology used herein is for the purpose of describing particular embodiments only and is not intended to limit the invention. As used herein, the singular forms a, and an are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for performing data synchronization between a source database management system, comprising a trusted source database, and a target database management system, comprising a target database, comprising an untrusted target data store and a trusted target data store, the method comprising:
   upon the source database management system performing an update to an object in the trusted source database, wherein the update to the object relates to an object change, sending the object change to a trusted data replication engine;
   generating, at the trusted data replication engine, a new encryption key for the object change, wherein the new encryption key replaces a previous key in a key ring store;
   encrypting the object change with the new encryption key;
   sending the encrypted object change together with the new encryption key to the target database management system;
   upon receiving the encrypted object change and the new encryption key the target database management system, replacing the previous key in its trusted data store key ring with the new encryption key;
   and
   integrating the encrypted object change in encrypted form into the untrusted target data store.

2. The method of claim 1, wherein the encryption of the object change is performed by the trusted data replication engine.

3. The method of claim 2, further comprising:
   maintaining a set of decryption keys by the trusted data replication engine related to encryption keys used by the trusted data replication engine.

4. The method of claim 3, wherein each decryption key of the set of decryption keys has a unique identifier compatible with an object identifier for objects in the trusted source database, such that each object is mappable to a related decryption key.

5. The method of claim 3, wherein the set of decryption keys is implemented using a hash table; and wherein one or more decryption keys in the set of decryption keys has an automatic key expiration rule.

6. The method of claim 3, wherein the set of decryption keys is stored in the trusted target data store.

7. The method of claim 1, wherein the encryption of the object change is performed using the related encryption key.

8. The method of claim 1, further comprising:
   upon receiving a query for an object in the target database, retrieving a corresponding latest encrypted object version from the untrusted target data store;
   retrieving a decryption key from its trusted data store key ring corresponding to the queried object; and
   decrypting the latest encrypted object version using the retrieved decryption key.

9. A database management system for data synchronization between a source database management system, comprising a trusted source database, and a target database management system, comprising a target database, comprising an untrusted target data store and a trusted target data store, the database management system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the database management system is capable of performing a method comprising:
   upon the source database management system performing an update to an object in the trusted source database, wherein the update to the object relates to an object change, sending the object change to a trusted data replication engine;
   generating, at the trusted data replication engine, a new encryption key for the object change, wherein the new encryption key replaces a previous key in a key ring store;
   encrypting the object change with the new encryption key;
   sending the encrypted object change together with the new encryption key to the target database management system;
   upon receiving the encrypted object change and the new encryption key the target database management system, replacing the previous key in its trusted data store key ring with the new encryption key;
   and
   integrating the encrypted object change in encrypted form into the untrusted target data store.

10. The database management system of claim 9, further comprising:
   a trusted data replication engine for the encryption of the object change.

11. The database management system of claim 10, wherein the trusted data replication engine maintains a set of decryption keys, thereby relating to encryption keys used by the trusted data replication engine.

12. The database management system of claim 11, wherein each decryption key of the set of decryption keys has a unique identifier compatible with an object identifier for objects in the trusted source database, such that each object is mappable to a related decryption key.

13. The database management system of claim 11, wherein the set of decryption keys is implemented using a hash table.

14. The database management system of claim 13, wherein the set of decryption keys is stored in the trusted target data store.

15. The database management system of claim 9, wherein the encryption of the object change is performed using the related encryption key.

16. The database management system of claim 9, further comprising:
   upon receiving a query for an object in the target database, retrieving a corresponding latest encrypted object version from the untrusted target data store;
   retrieving a decryption key from its trusted data store key ring corresponding to the queried object; and
   decrypting the latest encrypted object version using the retrieved decryption key.

17. A computer program product for performing data synchronization between a source database management system, comprising a trusted source database, and a target database management system, comprising a target database, comprising an untrusted target data store and a trusted target data store, the computer program product comprising:
   one or more computer-readable tangible storage medium and program instructions stored on at least one of the one or more tangible storage medium, the program instructions executable by a processor to cause the processor to perform a method comprising:
   upon the source database management system performing an update to an object in the trusted source database, wherein the update to the object relates to an object change, sending the object change to a trusted data replication engine;
   generating, at the trusted data replication engine, a new encryption key for the object change, wherein the new encryption key replaces a previous key in a key ring store;
   encrypting the object change with the new encryption key;
   sending the encrypted object change together with the new encryption key to the target database management system;
   upon receiving the encrypted object change and the new encryption key the target database management system, replacing the previous key in its trusted data store key ring with the new encryption key;
   and
   integrating the encrypted object change in encrypted form into the untrusted target data store.

* * * * *